United States Patent
Huang et al.

(10) Patent No.: US 10,803,573 B2
(45) Date of Patent: Oct. 13, 2020

(54) METHOD FOR AUTOMATED DETECTION OF DEFECTS IN CAST WHEEL PRODUCTS

(71) Applicant: SOUTH CHINA UNIVERSITY OF TECHNOLOGY, Guangzhou (CN)

(72) Inventors: Qian Huang, Guangzhou (CN); Weixin Yan, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 339 days.

(21) Appl. No.: 15/736,518

(22) PCT Filed: Dec. 29, 2015

(86) PCT No.: PCT/CN2015/099632
§ 371 (c)(1),
(2) Date: May 29, 2018

(87) PCT Pub. No.: WO2016/201947
PCT Pub. Date: Dec. 22, 2016

(65) Prior Publication Data
US 2018/0253836 A1    Sep. 6, 2018

(30) Foreign Application Priority Data
Jun. 16, 2015    (CN) .......................... 2015 1 0334740

(51) Int. Cl.
G06T 7/00      (2017.01)
G06K 9/46      (2006.01)
G06K 9/62      (2006.01)

(52) U.S. Cl.
CPC .......... *G06T 7/0004* (2013.01); *G06K 9/4628* (2013.01); *G06K 9/628* (2013.01);
(Continued)

(58) Field of Classification Search
CPC ......... G06T 7/0004; G06T 2207/20081; G06T 2207/20084; G06T 2207/30116; G06K 9/4628; G06K 9/6274; G06K 9/628
See application file for complete search history.

(56) References Cited

U.S. PATENT DOCUMENTS 3,978,712 A * 9/1976 Cowan ................... G01B 17/06
                                                    73/598
5,368,260 A * 11/1994 Izbinsky ................. G01S 17/88
                                                    246/169 R
(Continued)

FOREIGN PATENT DOCUMENTS

CN    104458755    3/2015
CN    104574408    4/2015
(Continued)

*Primary Examiner* — Mia M Thomas
(74) *Attorney, Agent, or Firm* — JMB Davis Ben-David

(57) ABSTRACT

A method for automatic defect inspection in wheel shaped casting products is provided, and the three major phases contain preprocessing samples, offline training and online inspection. Specific steps include: collecting and preprocessing training samples, dividing them into three kinds of spoke, rim and axle samples; offline training with the aforementioned three kinds of samples, then generating online detectors respectively for spokes, rims and axles; uploading the well-trained spoke, rim and axle CNN defect detector to the upper computer, placed it in automatic production inspection line. Inspect for defects online automatically. The defect inspection system outputs signals according to the user's requirements. The present invention has a high level of accuracy and reliability, and a strong robustness to variations in illumination, shooting angle and the position of the work piece. It delivers a high level of automation and has no need for an operator to adjust any significant parameters.

9 Claims, 9 Drawing Sheets

(52) U.S. Cl.
CPC .. *G06K 9/6274* (2013.01); *G06T 2207/20081* (2013.01); *G06T 2207/20084* (2013.01); *G06T 2207/30116* (2013.01)

(56) References Cited

U.S. PATENT DOCUMENTS

| | | | | |
|---|---|---|---|---|
| 5,636,026 A * | 6/1997 | Mian | ............ | B61K 9/12 250/224 |
| 6,262,573 B1 * | 7/2001 | Wojnarowski | ............ | B61K 9/10 324/217 |
| 6,523,411 B1 * | 2/2003 | Mian | ............ | G01N 29/225 73/602 |
| 6,675,077 B2 * | 1/2004 | Dembosky | ............ | B61F 5/383 701/19 |
| 8,400,624 B2 * | 3/2013 | De Sloovere | ............ | G01B 11/25 356/139.09 |
| 9,625,402 B2 * | 4/2017 | Dalal | ............ | G06T 7/0004 |
| 9,707,984 B2 * | 7/2017 | De La Riva | ............ | B61K 9/12 |
| 9,714,043 B2 * | 7/2017 | Mian | ............ | B61L 15/0081 |
| 9,976,967 B2 * | 5/2018 | Bense | ............ | G01N 25/72 |
| 10,169,859 B1 * | 1/2019 | Kung | ............ | G06T 7/001 |
| 10,435,052 B2 * | 10/2019 | Mesher | ............ | B61L 23/00 |
| 10,497,108 B1 * | 12/2019 | Knuffman | ............ | G07C 5/006 |
| 10,607,084 B1 * | 3/2020 | Tang | ............ | G06N 3/08 |
| 2003/0072001 A1 * | 4/2003 | Mian | ............ | B61K 9/12 356/446 |
| 2003/0194124 A1 * | 10/2003 | Suzuki | ............ | G06T 7/0012 382/156 |
| 2005/0259273 A1 * | 11/2005 | Mian | ............ | B61K 9/08 356/601 |
| 2006/0114531 A1 * | 6/2006 | Webb | ............ | G01N 21/8806 359/15 |
| 2007/0057815 A1 * | 3/2007 | Foy | ............ | G06Q 30/06 340/905 |
| 2007/0064244 A1 * | 3/2007 | Mian | ............ | B61K 9/12 356/601 |
| 2008/0123809 A1 * | 5/2008 | Tudor | ............ | G01V 5/0016 378/57 |
| 2008/0292178 A1 * | 11/2008 | Sones | ............ | G01N 21/909 382/152 |
| 2009/0138290 A1 * | 5/2009 | Holden | ............ | G06Q 10/087 705/4 |
| 2010/0080442 A1 * | 4/2010 | Sones | ............ | G01N 21/9036 382/143 |
| 2011/0222385 A1 * | 9/2011 | Lai | ............ | G11B 7/0037 369/53.11 |
| 2012/0188237 A1 * | 7/2012 | Han | ............ | A63F 13/10 345/419 |
| 2014/0177907 A1 * | 6/2014 | Argue | ............ | G06T 7/0002 382/103 |
| 2014/0184786 A1 * | 7/2014 | Georgeson | ............ | G01N 21/8851 348/128 |
| 2014/0288859 A1 * | 9/2014 | Wittmann | ............ | G01L 17/005 702/55 |
| 2014/0309845 A1 * | 10/2014 | Wittmann | ............ | H04N 7/185 701/31.5 |
| 2015/0103160 A1 * | 4/2015 | Dalal | ............ | G01M 17/027 348/125 |
| 2015/0161778 A1 * | 6/2015 | Henderkott | ............ | G06T 7/0008 348/129 |
| 2017/0066459 A1 * | 3/2017 | Singh | ............ | B61L 23/045 |
| 2017/0336293 A1 * | 11/2017 | Kondo | ............ | B61K 9/12 |
| 2018/0211455 A1 * | 7/2018 | Dillow | ............ | G07C 5/008 |
| 2018/0222504 A1 * | 8/2018 | Birch | ............ | B61L 23/045 |
| 2018/0237041 A1 * | 8/2018 | Mesher | ............ | H04N 5/2254 |
| 2019/0003983 A1 * | 1/2019 | Al-Omari | ............ | G01N 21/8851 |
| 2019/0154442 A1 * | 5/2019 | Annovi | ............ | H04N 13/254 |
| 2019/0261565 A1 * | 8/2019 | Robertson | ............ | G06K 9/00664 |

FOREIGN PATENT DOCUMENTS

| | | | |
|---|---|---|---|
| CN | 105118044 | 12/2015 | |
| CN | 101021491 | 12/2016 | |
| JP | 3220123 A1 * | 9/2017 | ............ G01M 17/10 |

\* cited by examiner

METHOD FOR AUTOMATED DETECTION OF DEFECTS IN CAST WHEEL PRODUCTS

CROSS-REFERENCE TO RELATED APPLICATIONS

This is the U.S. National Stage of International Application No. PCT/CN2015/099632 filed Dec. 29, 2015, which was published in Chinese under PCT Article 21(2), and which in turn claims the benefit of China Patent Application No. 201510334740.3, filed Jun. 16, 2015.

FIELD OF INVENTION

The present invention relates to the field of computer vision. More particularly, it relates to an automatic detecting technique to reveal casting defects on wheels.

BACKGROUND

Various defects, on wheel products that are formed in the casting process, occur internally due to the technology, the design, the materials and the facilities etc. The American Society for Testing and Materials (ASTM) has set the standards and reference pictures for defects in casting products, and set the levels of influences on product qualities by defects in the light of the size of the defects outer contours and the ratio of the area of the defects to a unit area. Usually, during inspection, the casting products are imaged by X-ray equipment, the revealed defects are compared with reference defects in standard pictures. If the defect areas surpass the quality standard chosen by the user, that is the defect areas surpasses a certain size, the wheel quality is judged as unacceptable.

Defect inspection of casting products includes manual as well as machine inspection.

Manual inspection is where the operator judges by eye whether a casting defect that appears on the screen of the X ray machine is within the quality level of acceptable products depending on the size of the defect and its shape etc. The common problems of manual inspection are personnel fatigue due to the long hours required for the inspection and identification work, the inefficiency of the process of defect recognition, the instability of judging standards, the subjectivity of the results, etc.

At present, most manufacturing lines rely on manual inspection, mainly because the automatic image recognition technologies of machines cannot meet the required quality control standard required of the manufacturing lines. Their precision in judging whether the defects exist or not is poor, and so they are unable to accurately determine the quality levels of the products.

Automatic machine inspection for defects has been the subject of technological development for a long time. The prior arts are mainly reflected in two aspects of the technical methods. The first one is the image processing methods used to evaluate low-level features of the images. The second one is the multi-perspective image fusion analysis method coming from stereoscopic vision.

With image analysis and processing techniques like denoising, enhancement, regional division, edge extraction, contour closing, object segmentation, object padding, etc. which are focused on the low-level features of the images; these methods are the first steps in determining whether there are any defects in the product image. The grade of the defect is first specified and then it is finally determined whether the products meet the required standard by calculating the area of the target defect, measuring its contours' perimeter as well as the percentage of the defective area per unit product area, and so on.

This method, however, completely relies on the low-level features of images and involves numerous parameter adjustments, which not only require a proficient professional operator, but more importantly the frequent adjustment of parameters means that the inspection criteria are continually changing which decreases the precision of the defect inspection that can be achieved.

The primary reason for the errors in this kind of technology is that the shape and grayscales of the casting defects are random variables and the low-level image features fail to express and depict invisible features, or are specified as high-level features. The other kind of method: multi-perspective image fusion analysis, has also been under development for a long time. By employing space imaging and judging the existence of defects from many perspectives, the size and the grade of defects can be ascertained more precisely. Theoretically speaking, this kind of method is still based on low-level image features. It is not essentially different from previous methods merely recognizing target defects on image shots from different perspectives, using images fusion techniques to increase the accuracy of recognition. Most importantly it also relies on a large number of parameter settings and adjustments. Moreover, this method increases costs due to its additional hardware. Besides, these methods are not very reliable because the technologies for detecting casting defects for a single image are still under development.

SUMMARY OF THE INVENTION

The aim of the invention is to overcome the shortcomings and the insufficiency of existing technologies, and provide an automatic method of defect detection for wheel shaped casting products.

The purpose of the invention is realized by the following technical scheme:

An automatic defect detection method using neural networks for wheel shaped casting products which includes three stages: sample pre-processing, off-line training and online testing, comprise of the following steps:

(S1) collecting over 60,000 training samples and ensuring the sample numbers of spokes, rims and axles are greater than 20,000 respectively. The ratio of said positive and negative samples is set at 1:2;

(S2) pre-processing the aforementioned samples;

(S3) classifying the said samples into three classes of spoke, rim and axle for subsequent processing;

(S4) offline training using the samples of spoke, rim and axle respectively, and then obtaining online useable defect detectors of spoke, rim and axle;

(S5) loading the well-trained defect detectors based on convolutional neural networks for spokes, rims and axles into the upper computer and placed on to the automatic inspection production line;

(S6) inspect defects online automatically;

(S7) according to the user's requirements, a defect image or alarm signal is output by the defect inspection system.

The phase of pre-processing samples in the said step (S2) further comprise:

(S2-1) smoothing and filtering the collected wheel hub images by utilizing a 3×3 domain template in order to eliminate noise which emerges from the imaging process;

(S2-2) using a gradient sharpening algorithm to process the images. All pixels are processed one by one. Adding the absolute difference between the current pixel and the next pixel in the same line to the absolute difference between the current pixel and the next pixel in the next line. Comparing the sums with a set threshold, if the sum is greater than the threshold, take this result as the current pixel. Doing so can emphasize profiles and facilitate analysis;

(S2-3) equalizing the histogram of the image obtained from the step (S2-2);

(S2-4) normalizing the image obtained from the step (S2-3) in order to accelerate the astringency of the network training.

The said step (S3) divides samples into three main categories of spoke, rim and axle, which further comprise of the specific processing steps:

(S3-1) dividing an image sample into small images of M×M, where M can take the values of 80, 100 or 120. Marking every one of the small images as negatives or positives depending on whether a defect exists or not.

(S3-2) training convolutional neural networks with samples got from step (S3-1). In order to enhance the robustness of the detectors, all image samples are slightly resized (0.96 to 1.08 times), contrast stretched (contrast coefficient from 0.8 to 1.2) and rotated (−60° to 60°, each time each time up to 5 degrees) randomly.

(S3-3) when small-lot samples are called, the number of samples can be 64. The samples are flipped horizontally and Gaussian noise are added randomly. N×N pixel areas are chosen from the transformed small-lot samples as the training samples for the convolutional neural networks. For instance, N can be 96 if M is 100 or 120 to increase sample diversity, which presents an effective approach to gain better generalization ability.

The step (S4) of training defect detectors, which is generating neural networks models to inspect the defects for wheel hubs, further comprise:

(S4-1) making use of the samples of spoke, rim and axle images; employing a Back Propagation (BP) algorithm to train the neural network for defects in the spokes, rims and axles respectively. Using smallest lot samples to calculate the error and update the connection weights in every loop;

(S4-2) setting the learning rate as 0.01;

(S4-3) in every loop, setting 64 as the number of small-lot and updating parameters with average errors;

(S4-4) designing neural networks. The defect detecting neural networks for wheel shaped products are multilayer convolutional neural networks, which automatically learn features supervised from a large number of samples. The input is an image, and the output is the classified label of the image. The neuron number is arranged as the pixel number of the input image, while only one neuron node is arranged in the output layer and the output is the classification result of the image. The defect detecting neural networks consists of two parts: the first part is a multistage feature extractor that alternately combines convolutional layers, down-sampling layers and local response normalization layers, and executes convolution, down-sampling and nonlinear transformation; the second part is a classifier that is a fully connected neural network consisting of two fully connected layers, which is trained with a back propagation algorithm and can classify the image features of wheel hubs extracted from the said first part correctly. In this technical scheme, the feature extraction of the defect detecting neural networks contains two stages. The first stage is an extraction of low-level features, such as dots and lines. The second is a linear combination of low-level features to generate high-level features via back propagation training.

(S4-5) when classifying samples, the defect detecting neural network divides an image of the wheel shaped product into small images of M×M. To every small image, when M is 100, it takes five 96×96 subareas from the upper left corner, the upper right corner, the lower left corner, the lower right corner and the center of the image as inputs of the convolution neural network, calculating the mean value of the five outputs of the said neural networks, and judging whether this area is defective or not according to the final mean value. Setting [0, 1] as the output range, if the output mean value is greater than the set threshold 0.5, it indicates this area in the image of wheel shaped product as defective, otherwise not.

(S4-6) stop training the neural networks when they meet the set accuracy on the test image set, and become effective defect detectors.

When detecting online, the detecting process follows the detection procedure from axle to spoke then to rim, automatically obtaining online images from different working positions in a sequential manner.

The online automatic inspection stage of the defect detecting process of step (S6) further comprises:

(S6-1) obtaining the axle image of a wheel hub, pre-processing it by utilizing the same offline method of pre-processing image samples, then use the axle detector to inspect for defects in each axle image. If any defects are found, their regions are marked and stored the image, which is named as its precise date and time of inspection;

(S6-2) obtaining the spoke image of a wheel hub, pre-processing it by utilizing the same offline method of pre-processing image samples, then use the spoke detector to inspect for defects in each spoke image. If any defects are found, their regions are marked and stored the image, which is named as its precise date and time of inspection;

(S6-3) obtaining the rim image of a wheel hub, pre-processing it by utilizing the same offline method of pre-processing image samples, then use the rim detector to inspect for defects in each rim image. If any defects are found, their regions are marked and stored the image, which is named as its precise date and time of inspection;

(S6-4) according to the user's requirements, an image or alarm signal is output by the defect inspection system.

(S6-5) at steps S6-1 to S6-3, if defects are found in any images, send the wheel to the unqualified product zone, otherwise to the qualified one.

Compared to prior arts, the present invention has the following advantages and beneficial effects:

1. In the training phase, the convolutional neural networks learns essential features from positive and negative samples of spokes, rims and axles, those features are more identifiable and classable than manually extracted ones;
2. Because the convolutional neural network has a certain robustness for identifying some degrees of displacement, scaling, and other forms of distortion in the images, the trained detectors for wheel defects have a degree of robustness in practical wheel hub defect inspection, and have a better performance for wheel hub defects that are not similar in shape;
3. The detector has a strong robustness for dealing with variations in illumination and pose;
4. Because the inspection procedures require no human intervention, the wheel hub inspection can introduce a high level of automation, high production efficiency, simple operation and low operation cost.

BRIEF DESCRIPTION OF THE DRAWINGS

FIGS. 8-1 to 8-3 are images showing the defect inspection results of a spoke, rim and axle respectively.

DETAILED DESCRIPTION

The present method will be described in greater detail by referring to the following embodiment and drawings that are attached to the present method. However, the said method can be employed in terms of other embodiments.

Figure 1:
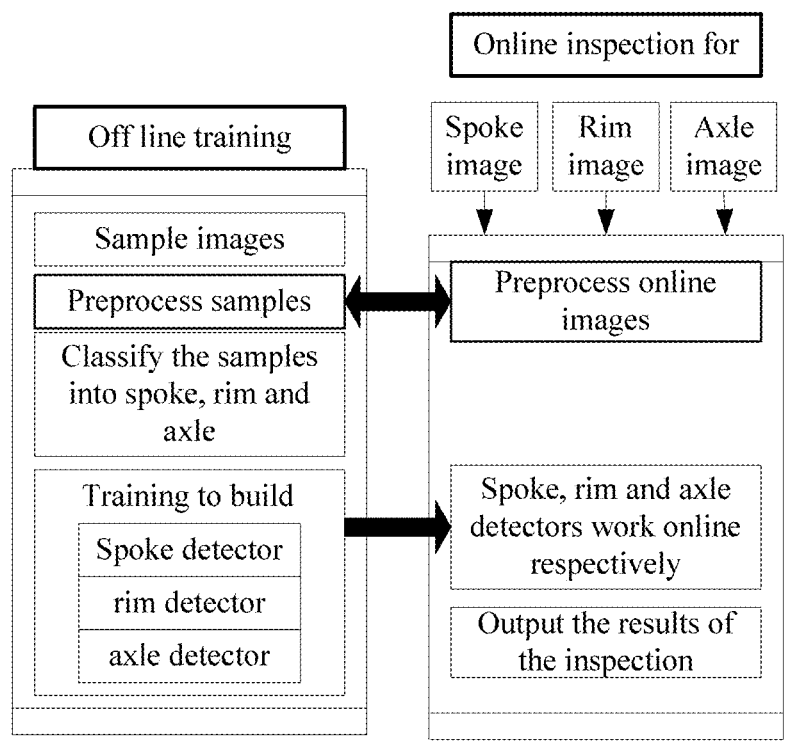
FIG. 1 is a diagram of the algorithm module illustrating the defect inspection approach for wheel shaped products.

FIG. 1 illustrates the two working parts of the present method: the offline and the online. The offline part offers the work basis for the online one, the online part carries out an online inspection and the recognition process for defects according to the method and detectors generated by the offline part.

The neural network based automatic defect detection method and system for wheel shaped products comprises of the following steps:

(S1) collecting over 60,000 training samples and ensuring the sample numbers of spokes, rims and axles are greater than 20,000 respectively. The ratio of the said positive and negative samples is set 1:2;

(S2) pre-processing the aforementioned samples;

(S3) classifying the said samples into three classes of spoke, rim and axle for subsequent process;

(S4) offline training using the samples of spoke, rim and axle respectively, and then obtaining online useable defect detectors of spoke, rim and axle;

(S5) loading the well-trained convolutional neural network defect detectors for spokes, rims and axles into the upper computer which is placed on to the automatic inspection production line;

(S6) inspect defects online automatically;

(S7) according to the user's requirements, the image or alarm signal is output by the defect inspection system.

Figure 2:
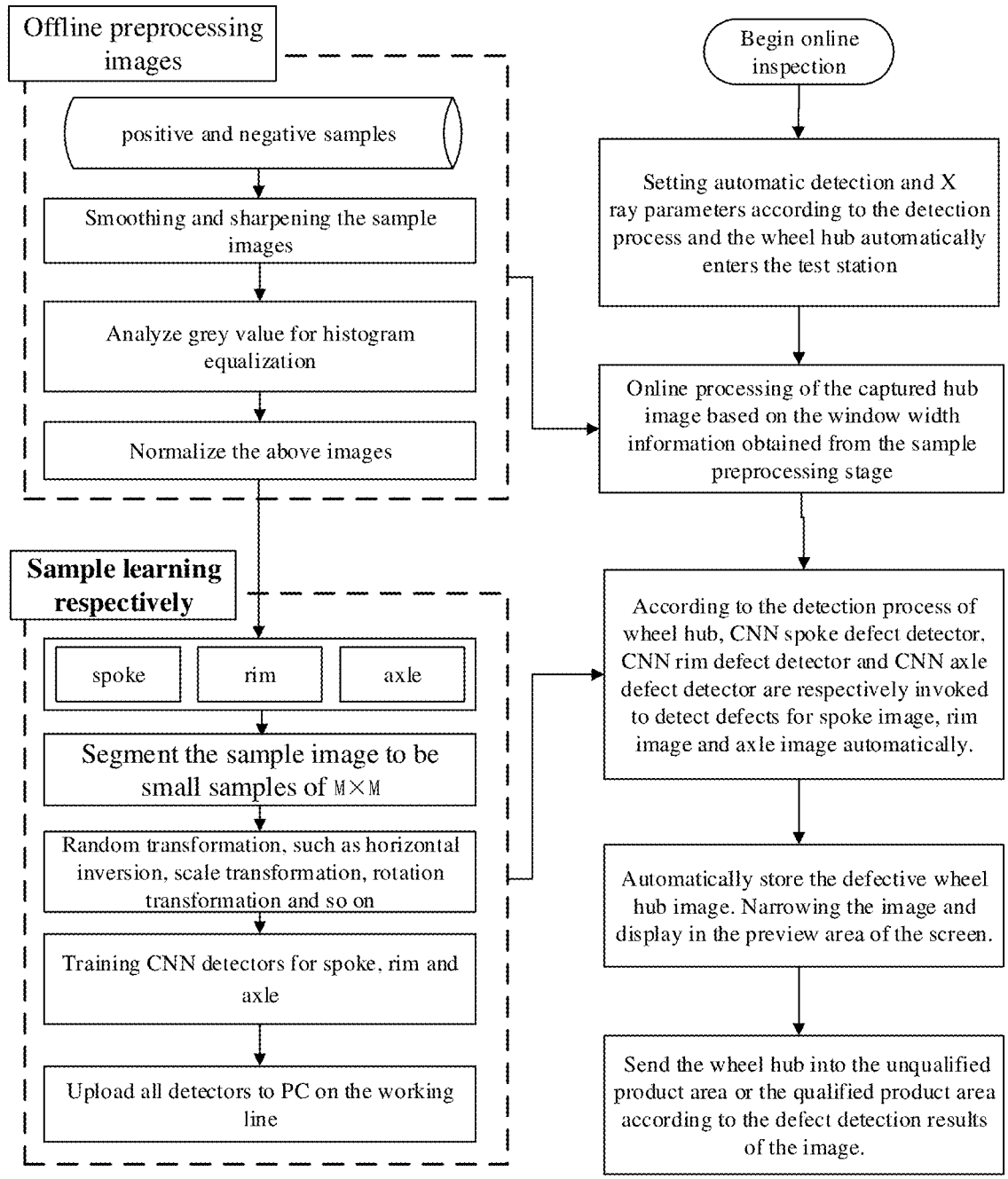
FIG. 2 is a flow chart illustrating the said automatic defect detection method for wheel shaped products.

The specific procedures of the wheel shaped product defect detecting method that is based on the convolutional neural network is illustrated as FIG. 2, which involves three major phases: pre-processing samples, offline training and online inspection. The said pre-processing phase of the samples includes the following steps:

(S2-1) smoothing and filtering the collected wheel hub images by utilizing a 3×3 domain template in order to eliminate noise which emerges from the imaging process;

(S2-2) using a gradient sharpening algorithm to process the images. All pixels are processed one by one. Adding the absolute difference between the current pixel and the next pixel in the same line to the absolute difference between the current pixel and the next pixel in the next line. Comparing the sums with a set threshold, if the sum is greater than the threshold, take this result as the current pixel. Doing so can emphasize profiles and facilitate analysis;

(S2-3) equalizing the histogram of the image obtained from the step (S2-2);

(S2-4) normalizing the image obtained from the step (S2-3) in order to accelerate the astringency of the network training.

At the said offline training phase, firstly, classify samples into three classes of spoke, rim and axle and process them. The specific procedures for processing include:

(S3-1) cutting an image sample apart into the small images of M×M, wherein M can take the values 80, 100 or 120. Marking every small image as a negative or positive sample in light of whether a defect exists or not.

(S3-2) training the convolutional neural network with samples got from step (S3-1). In order to enhance the robustness of the detectors, all image samples are slightly resized (0.96 to 1.08 times), contrast stretched (with a contrast coefficient of 0.8 to 1.2) and rotated (−60° to 60°, each time up to 5 degrees) randomly;

(S3-3) when small-lot samples are called, the number of samples can be 64. The samples are flipped horizontally and Gaussian noise are added randomly. N×N pixel areas are chosen from the transformed small-lot samples as the training samples for the convolutional neural networks. For instance, N can be 96 if M is 100 or 120 to increase sample diversity, which presents an effective approach to gain better generalization ability.

The training of defect detecting neural networks (i.e. defect detectors) contains:

(S4-1) making use of the samples of spoke, rim and axle images; employing a Back Propagation (BP) algorithm to train the neural network for defects in the spokes, rims and axles respectively. Using smallest lot samples to calculate the error and update the connection weights in every loop;

(S4-2) setting the learning rate as 0.01;

(S4-3) in every loop, setting 64 as the number of the small-lot and updating parameters with the average error;

(S4-4) designing neural networks. The defect detecting neural networks for wheel shaped products are multilayer convolutional neural networks, which automatically learn features supervised from a large number of samples. The input is an image, and the output is the classified label of the image. The neuron number is arranged as the pixel number of the input image, while only one neuron node is arranged in the output layer and the output is the classification result of the image. The defect detecting neural networks consists of two parts: the first part is a multistage feature extractor that alternately combines convolutional layers, down-sampling layers and local response normalization layers, and executes convolution, down-sampling and nonlinear transformation; the second part is a classifier that is a fully connected neural network consisting of two fully connected layers, which is trained with a back propagation algorithm and can classify the image features of wheel hubs extracted from the said first part correctly. In this technical scheme, the feature extraction of the defect detecting neural networks contains two stages. The first stage is an extraction of low-level features, such as dots and lines. The second is a linear combination of low-level features to generate high-level features via back propagation training.

(S4-5) when classifying samples, the defect detecting neural network divides an image of the wheel shaped product into small images of M×M. To every small image, when M is 100, it takes five 96×96 subareas from the upper left corner, the upper right corner, the lower left corner, the lower right corner and the center of the image as inputs of the convolution neural network, calculating the mean value of the five outputs of the said neural networks, and judging whether this area is defective or not according to the final mean value. Setting [0, 1] as the output range, if the output mean value is greater than the set threshold 0.5, it indicates this area in the image of wheel shaped product as defective, otherwise not.

(S4-6) stop training the neural networks when they meet the set accuracy on the test image set, and become effective defect detectors.

The said online inspection stage comprises the following procedure:

When detecting online, the detecting process follows the detection procedure from axle to spoke then to rim, automatically obtaining online images from different working positions in a sequential manner, the steps are as follows:

(S6-1) obtaining the axle image of a wheel hub, preprocessing it by utilizing the same offline method of preprocessing image samples, then use the axle detector to inspect for defects in each axle image. If any defects are found, their regions are marked and stored the image, which is named according to its inspection time and date;

(S6-2) obtaining the spoke image of a wheel hub, preprocessing it by utilizing the same offline method of preprocessing image samples, then use the spoke detector to inspect for defects in each spoke image. If any defects are found, their regions are marked and stored the image, which is named according to its inspection time and date;

(S6-3) obtaining the rim image of a wheel hub, preprocessing it by utilizing the same offline method of preprocessing image samples, then use the rim detector to inspect for defects in each rim image. If any defects are found, their regions are marked and stored the image, which is named according to its inspection time and date;

(S6-4) according to the user's requirements, an image or alarm signal is output by defect inspection system.

(S6-5) at the said steps S6-1 to S6-3; if defects are found in any images, the wheel is sent to the unqualified product zone; otherwise to the qualified zone.

Figure 3:
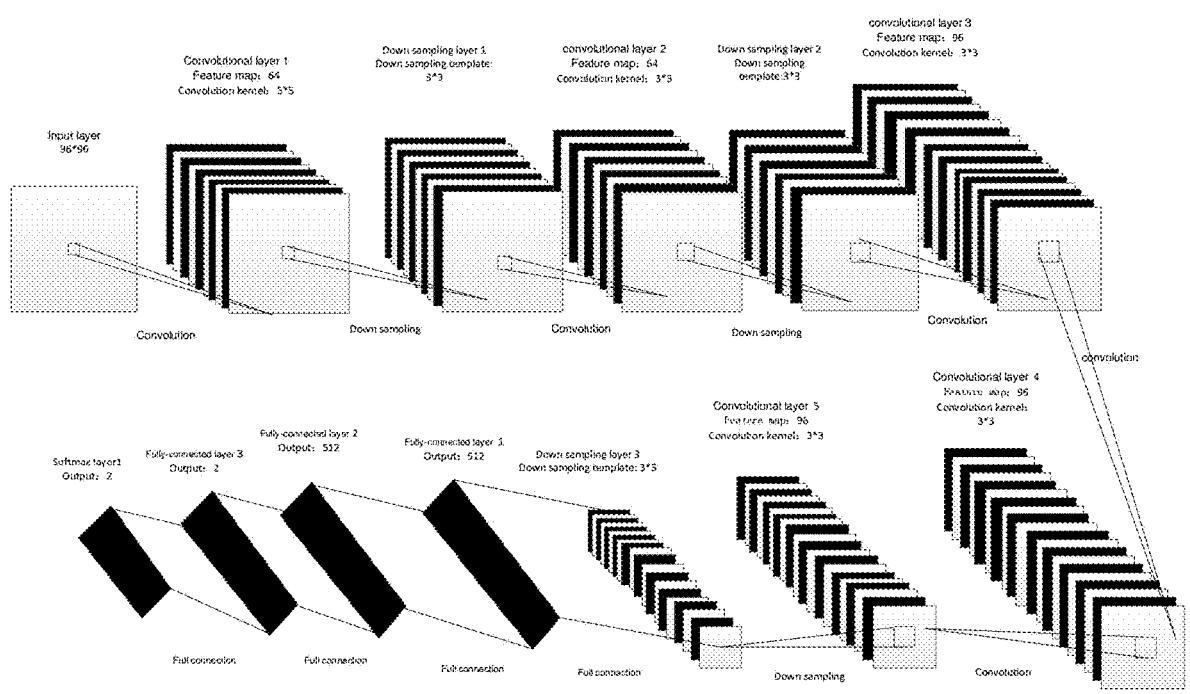
FIG. 3 is a schematic of the internal relations and structures of neural networks for wheel hub defect detection used for the said method in FIG. 2.

FIG. 3 is a schematic of the internal relations and structures of neural networks for wheel hub defect detection, wherein the output function of neurons for all convolution layers is RELU function, the pooling of all pools is the maximum pooling and the final output layer uses the Softmax layer. The present method collects actual images of wheel hubs from a manufacturing line and inspects the collected images by the said defect detecting approach.

Figure 4:
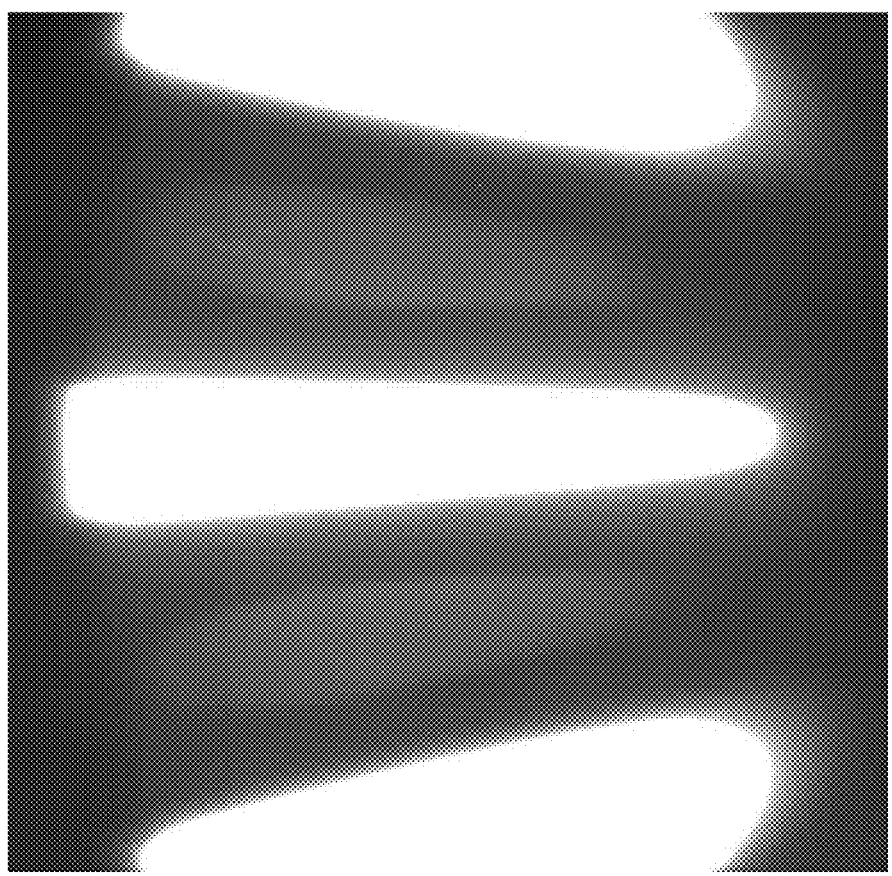
FIG. 4 is an original spoke sample image of a real product.

FIG. 4 is a spoke image with defects. As shown in FIG. 4, in the original image the contrast between the defects and their background is very low.

Figure 5:
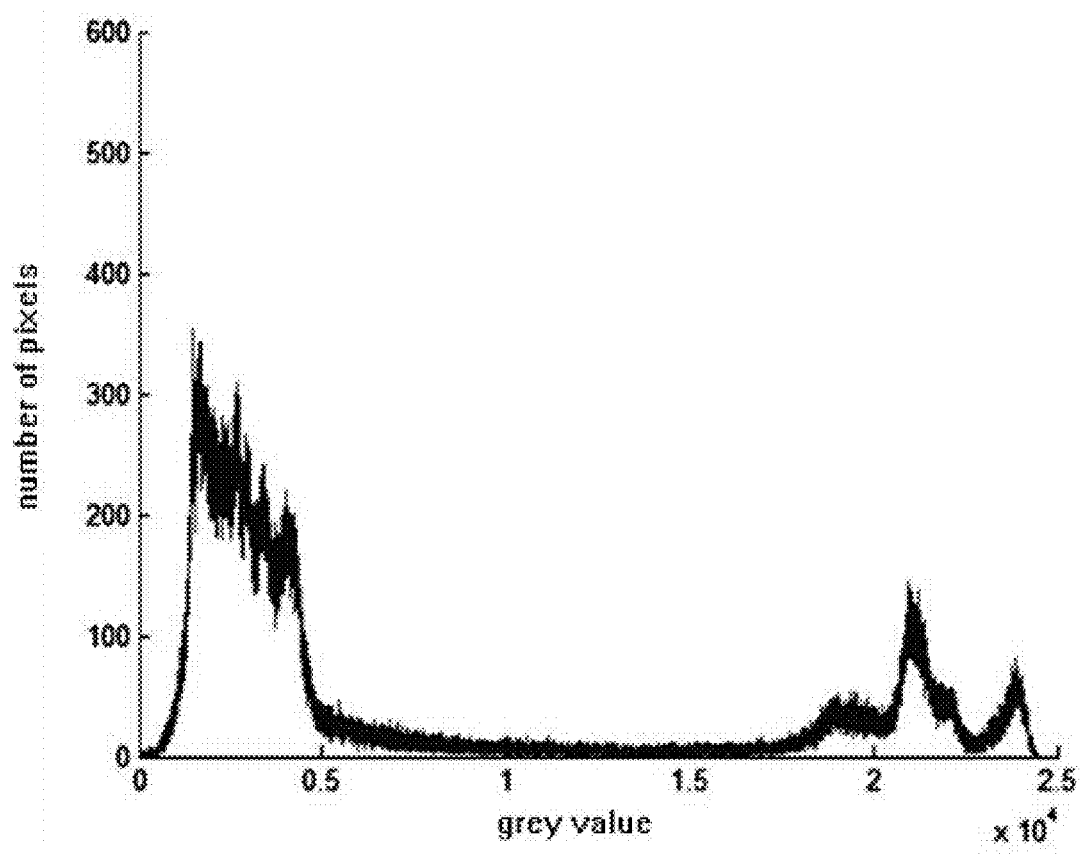
FIG. 5 is the grey scale histogram of FIG. 4.

FIG. 5 is the grey scale histogram of the image in FIG. 4. As shown in FIG. 5, the image contains redundant information.

Figure 6:
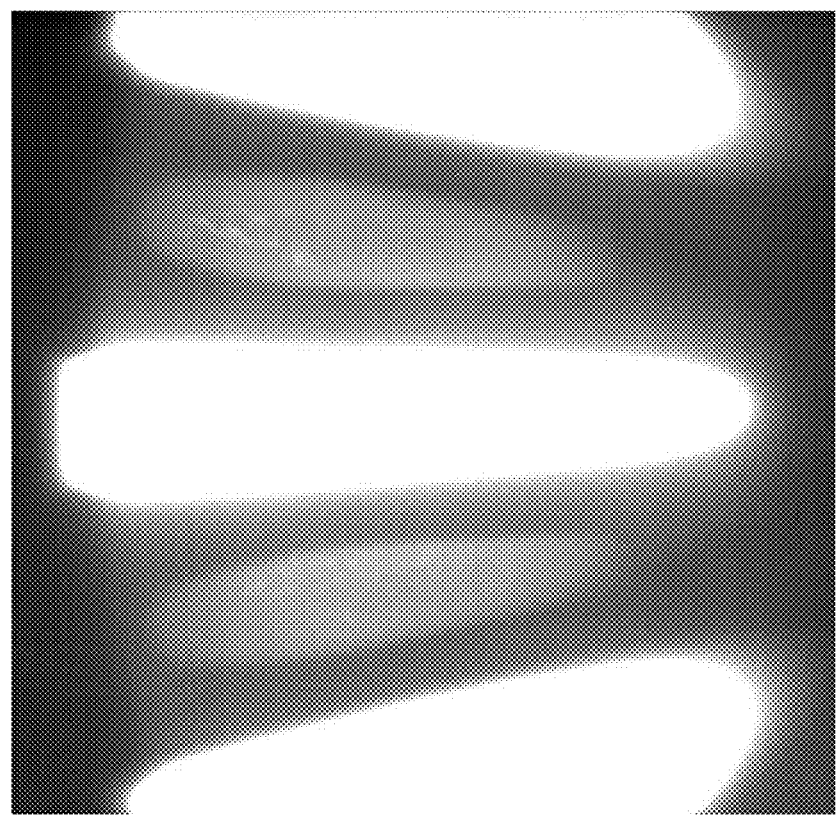
FIG. 6 is an image showing the preprocessing result of FIG. 4.

FIG. 6 is an image showing the preprocessing result of FIG. 4. As shown in FIG. 6, the contrast between the defects and their background in the image is higher than before, which makes the defects more obvious.

Figure 7:
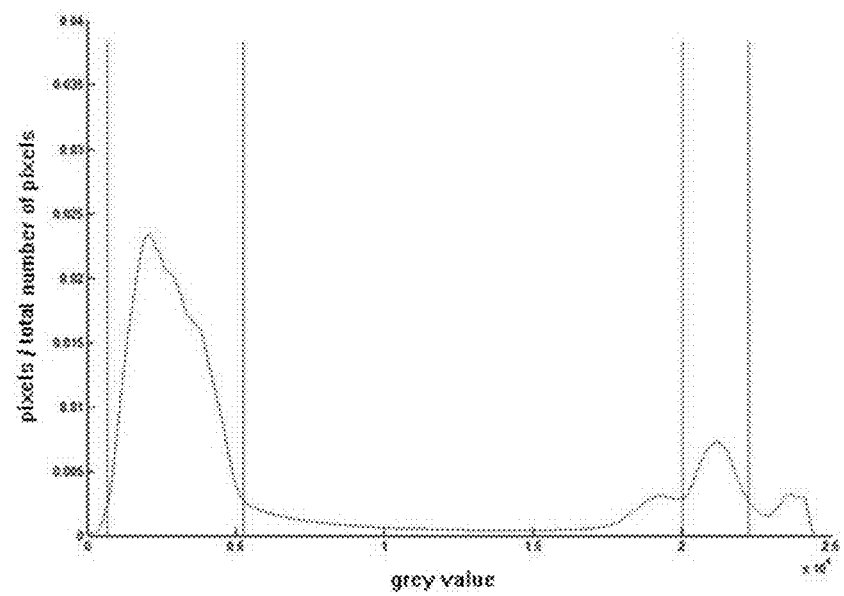
FIG. 7 is an image showing the maximum and secondary maximum of the histogram of FIG. 6.

FIG. 7 is an image showing maximum and second peak positions in the grey scale histogram of the image in FIG. 6, which matches the range of the grayscale of the original image.

Figures 1, 8:
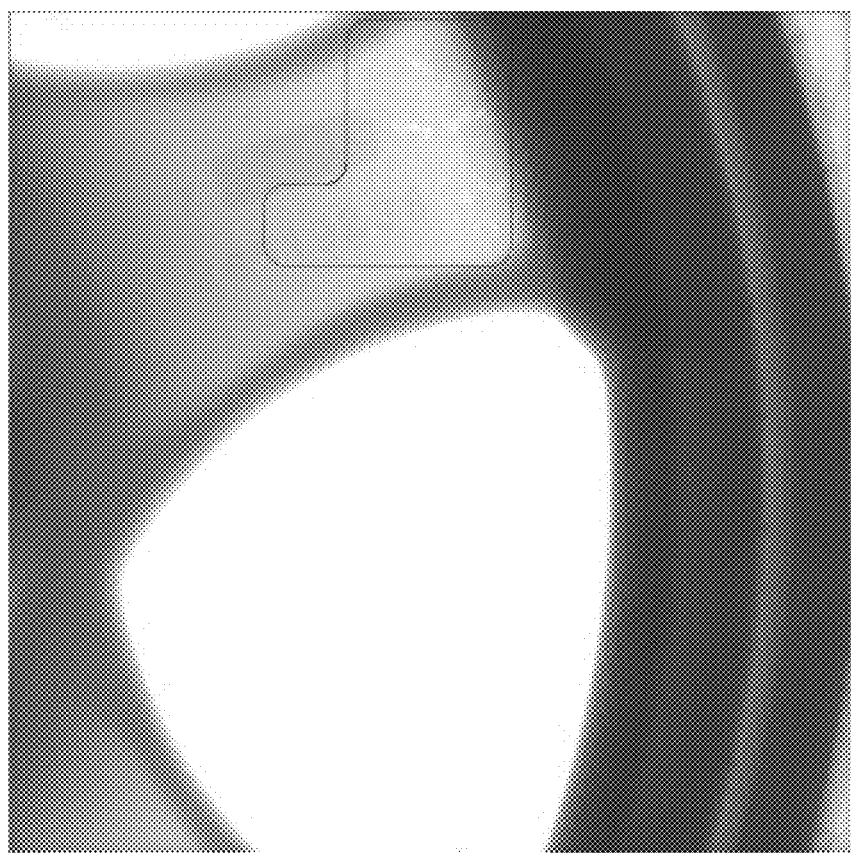
Figures 2, 8:
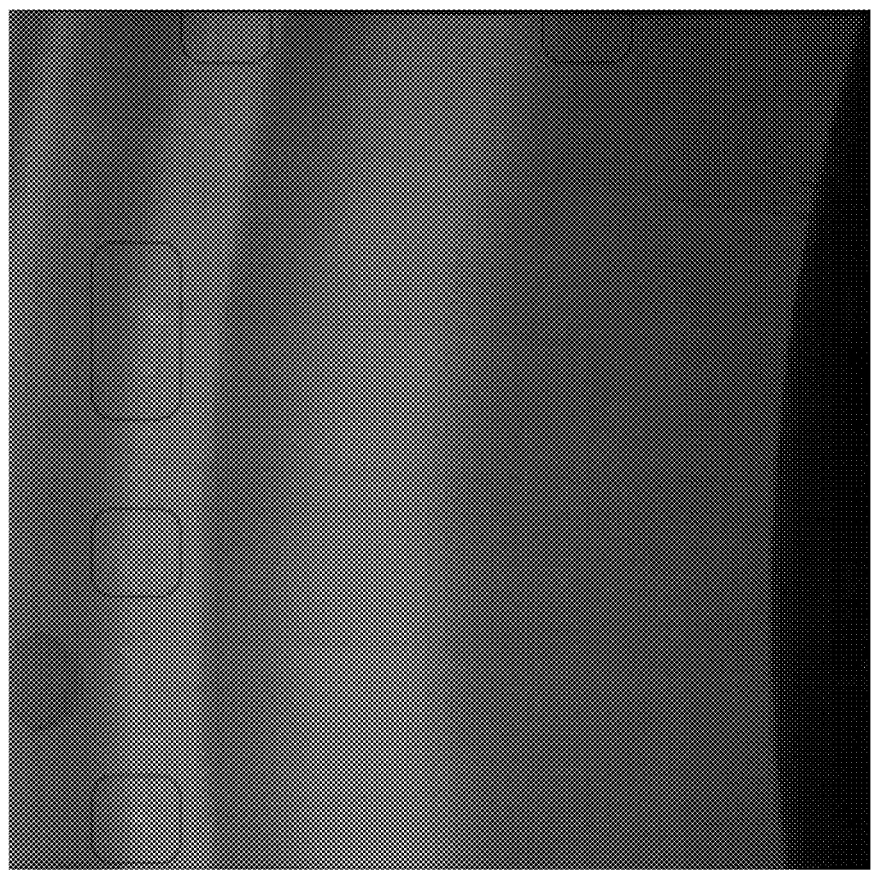
Figures 3, 8:
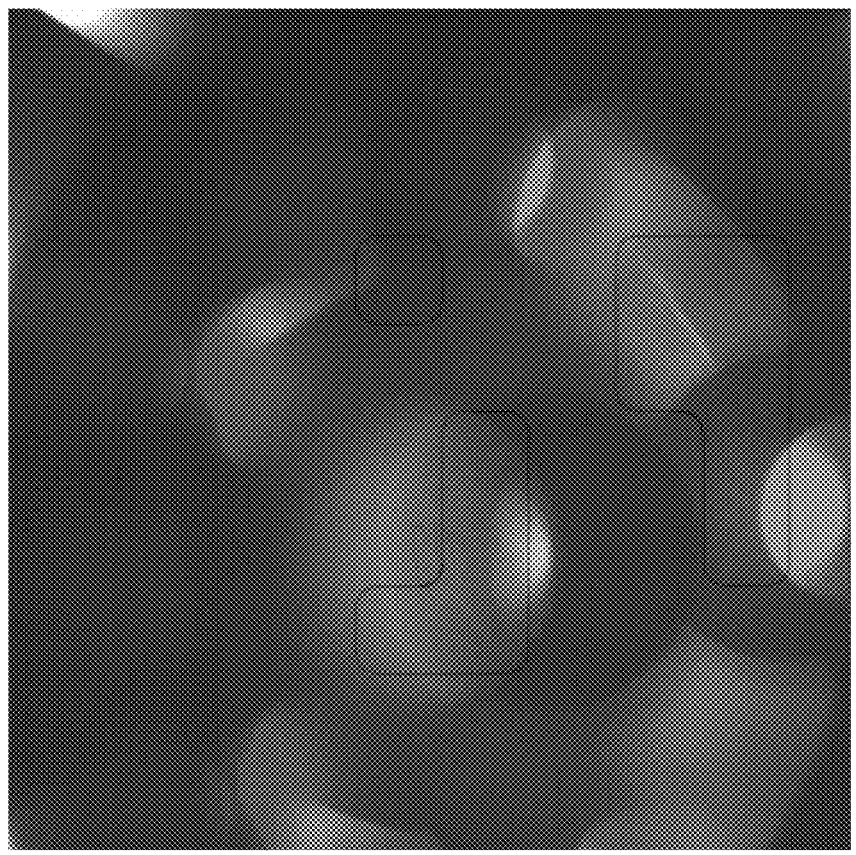

FIGS. 8-1-8-3 are result images showing the defect inspection of spoke, rim and axle respectively in one set of test samples. As shown in FIGS. 8-1-8-3, well-trained defect detectors can inspect and recognize the defects correctly and locate their positions on spokes, rims and axles. From the results of aforementioned set of test samples, the said method shows an excellent recognition capability in a practical industrial application.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for automatic detection of defects in wheel hub shaped casting products, comprising:
   (S1) collecting training samples;
   (S2) preprocessing the collected samples;
   (S3) classifying the preprocessed samples into three classes of spoke, rim and axle;
   (S4) conducting offline training using the classified samples of spoke, rim and axle respectively to obtain online adapted defect detectors of spoke, rim and axle;
   (S5) loading the online adapted defect detectors of spoke, rim and axle into a host computer, the online adapted defect detectors being disposed in an automatic defect inspection system;
   (S6) inspecting defects of spoke, rim and axle respectively online automatically; and
   (S7) outputting an image or alarm signal by the defect inspection system.

2. The method of claim 1, wherein step (S6) comprises:
   (S6-1) obtaining an axle image of a wheel hub, preprocessing the axle image by the same method as in step (S2), then using the online adapted defect detector of axle to inspect defects in the axle image, marking all defected regions in the axle image, if any, storing the axle image and naming same by time of inspection;
   (S6-2) obtaining a spoke image of a wheel hub, preprocessing the spoke image by the same method as in step (S2), then using the online adapted defect detector of spoke to inspect defects in the spoke image, marking all defected regions in the spoke image, if any, storing the spoke image and naming same by time of inspection;
   (S6-3) obtaining a rim image of a wheel hub, preprocessing the rim image by the same method as in step (S2), then using the online adapted defect detector of rim to inspect defects in the rim image, marking all defected regions in the rim image, if any, storing the spoke image and naming by time of inspection; and
   (S6-4) sending axle, spoke and rim images with defects, inspected in steps (S61)-(S63) to an unqualified product zone, and sending axle, spoke, and rim images without defect inspected in (S61) (S6-3) to a qualified product zone.

3. The method of claim 1, wherein step (S2) comprises:
   (S2-1) smoothing and filtering collected wheel hub images as the training samples by a 3×3 domain template in order to eliminate noise emerging from step (S1);
   (S2-2) adding the absolute difference between a first pixel and a second pixel in a first line to the absolute difference between the first pixel and a pixel in a second line corresponding to the first pixel to obtain a sum, where a gradient sharpening algorithm is used; if the sum is greater than a predetermined threshold, treating the sum as the pixel value of the first pixel;
   (S2-3) conducting histogram equalization on the image processed by step (S2-2); and
   (S2-4) normalizing the image processed by step (S2-3).

4. The method of claim 1, wherein step (S3) is comprises:
   (S3-1) dividing the preprocessed samples into M×M small images, wherein the small images with defects are treated as negative samples, and the small images without defect are treated as positive samples;

(S3-2) training a convolutional neural network with the samples treated by step (S3-1), where in order to enhance the detectors' robustness, the samples treated by step (S3-1) are slightly resized, rotated and contrast stretched randomly; and where 64 samples are called for each batch, the samples being transformed by flipping horizontally and adding with Gaussian noise randomly followed by randomly choosing an N×N pixel area from the transformed samples as training samples for the convolutional neural network.

5. The method of claim 4, wherein in step (S3-1) said number M is chosen from 80, 100 or 120.

6. The method of claim 4, wherein in step (S3-1) the ratio of the positive and the negative samples is 1:2.

7. The method of claim 1, wherein (S4) comprises:

(S4-1) employing a Back Propagation (BP) algorithm to train neural networks for the online adapted defect detectors of spoke, rim and axles respectively based on the classified samples of spoke, rim and axle, where in each iteration an error of the neural network is calculated and the connection weight is updated using a minimum batch;

a learning rate is set as 0.01, and a batch size is set as 64; and where the neural network training comprises firstly extracting low-level features and then linearly combining low-level features to form high-level features by BP algorithm;

(S4-2) inspecting defective areas of the spokes, rims and axles;

(S4-3) stopping training the neural networks when the accuracy of the neural networks on a test set reaches a predetermined value, so as to obtain the online adapted defect detectors of spoke, rim and axle.

8. The method of claim 7, wherein (S4-2) comprises:

dividing the classified samples into 100×100 small images, collecting five 96×96 images from an upper left corner, a lower left corner, an upper right corner, a lower right corner and a central area of each of the small image, calculating five outputs by the neural network and further calculating the mean value of the five outputs; given that an output range of the neural network is [0,1], classifying an area corresponding to the small image with a mean value larger than 0.5 as a defective area and an area corresponding to the small image with a mean value lower than 0.5 as an undefective area.

9. The method of claim 1, wherein the samples have an amount of greater than 60,000, and the classified samples of spoke, rim and axle have an amount of greater than 20,000, respectively.

* * * * *